US009916583B2

(12) United States Patent
Hammad

(10) Patent No.: US 9,916,583 B2
(45) Date of Patent: Mar. 13, 2018

(54) SYSTEM AND METHOD INCLUDING INDIRECT APPROVAL

(75) Inventor: Ayman Hammad, Pleasanton, CA (US)

(73) Assignee: Visa International Service Association, San Francisco, CA (US)

(*) Notice: Subject to any disclaimer, the term of this patent is extended or adjusted under 35 U.S.C. 154(b) by 1265 days.

(21) Appl. No.: 12/712,870

(22) Filed: Feb. 25, 2010

(65) Prior Publication Data
US 2010/0274688 A1  Oct. 28, 2010

Related U.S. Application Data

(60) Provisional application No. 61/173,371, filed on Apr. 28, 2009.

(51) Int. Cl.
*G06Q 30/00* (2012.01)
*G06Q 40/00* (2012.01)
(Continued)

(52) U.S. Cl.
CPC ......... *G06Q 20/401* (2013.01); *G06Q 20/202* (2013.01); *G06Q 20/325* (2013.01); *G06Q 20/40* (2013.01); *G06Q 30/0185* (2013.01); *G06Q 30/0224* (2013.01); *G06Q 30/0236* (2013.01); *G06Q 40/12* (2013.12);
(Continued)

(58) Field of Classification Search
None
See application file for complete search history.

(56) References Cited

U.S. PATENT DOCUMENTS 5,530,438 A   6/1996 Bickham
5,615,110 A   3/1997 Wong
(Continued)

FOREIGN PATENT DOCUMENTS

KR   10-2001-0078918 A   8/2001
KR      10-0620585 B1    9/2006
(Continued)

OTHER PUBLICATIONS

The International Search Report for Application No. PCT/US2010/032512, dated Dec. 14, 2010, 5 pages.
(Continued)

*Primary Examiner* — Ariel J Yu
(74) *Attorney, Agent, or Firm* — Kilpatrick Townsend & Stockton LLP

(57) ABSTRACT

A server computer is disclosed. It comprises a processor and a computer readable medium coupled to the processor. The computer readable medium comprises code executable by the processor for implementing a method comprising: a) receiving an authorization request message, wherein the authorization request message requests authorization to proceed with a transaction conducted between a first party and a second party using a portable device; b) analyzing the authorization request message by a server computer to determine if the portable device is enrolled in a transaction alert program; c) if the portable device is enrolled in the transaction alert program, sending a transaction alert request message to a third party requesting approval to proceed with the transaction; d) receiving a transaction alert response message from the third party; e) sending the authorization request message to an issuer associated with the portable device; f) receiving an authorization response message from the issuer; and g) sending the authorization response message to the second party.

13 Claims, 8 Drawing Sheets

(51) Int. Cl.
    *G06Q 20/40*     (2012.01)
    *G08B 5/22*     (2006.01)
    *G06Q 20/20*     (2012.01)
    *G06Q 30/02*     (2012.01)
    *G06Q 50/26*     (2012.01)
    *H04L 12/18*     (2006.01)
    *H04L 29/08*     (2006.01)
    *G06Q 20/32*     (2012.01)
    *G08B 25/00*     (2006.01)

(52) U.S. Cl.
    CPC ........... *G06Q 50/265* (2013.01); *G08B 5/229* (2013.01); *G08B 25/004* (2013.01); *H04L 12/1895* (2013.01); *H04L 67/04* (2013.01); *H04L 67/26* (2013.01); *H04L 67/306* (2013.01)

(56) References Cited

U.S. PATENT DOCUMENTS

| | | | |
|---|---|---|---|
| 5,708,422 A * | 1/1998 | Blonder | G06Q 20/40 340/5.41 |
| 5,878,337 A | 3/1999 | Joao | |
| 5,914,472 A * | 6/1999 | Foladare | G06Q 20/04 235/380 |
| 6,879,965 B2 | 4/2005 | Fung | |
| 7,533,047 B2 * | 5/2009 | Hagale et al. | 705/35 |
| 7,685,037 B2 | 3/2010 | Reiners | |
| 7,712,655 B2 | 5/2010 | Wong | |
| 7,877,326 B2 * | 1/2011 | Koch | 705/44 |
| 2004/0030659 A1 * | 2/2004 | Gueh | G06Q 20/3674 705/67 |
| 2010/0077036 A1 * | 3/2010 | DeLuca et al. | 709/206 |

FOREIGN PATENT DOCUMENTS

| | | |
|---|---|---|
| KR | 10-2006-0109562 A | 10/2006 |
| KR | 10-0842556 B1 | 7/2008 |

OTHER PUBLICATIONS

The International Written Opinion for Application No. PCT/US2010/032512, dated Dec. 14, 2010, 5 pages.

\* cited by examiner

502 — Employee Identifier — JSS
506 — Card Identifier — CRD1
508 — Credit Limit or Balance After Approval — $2389
510 — Transaction Amount — $1000
512 — Merchant Category — Electronics
514 — Transaction Approved — Y  N
516 — Contact Cardholder — Y  N 10 January 2010 at 8 pm

FIG. 7

SYSTEM AND METHOD INCLUDING INDIRECT APPROVAL

CROSS-REFERENCES TO RELATED APPLICATIONS

This application is a non-provisional of and claims the benefit of the filing date of U.S. provisional application No. 61/173,371, filed on Apr. 28, 2009, which is incorporated by reference in its entirety.

BACKGROUND

There are many occasions where a consumer may want to be notified when his credit card or the like is used. For example, he may want to know when his credit card account number has been used to make a purchase. Some (see, for example, U.S. Pat. No. 5,878,337) have suggested sending a notification transmission to a cardholder to allow the cardholder to approve or deny a transaction after receiving the notification transmission.

However, in some instances, it may be more appropriate for someone other than the cardholder to approve of the transaction. As will be discussed below, allowing a person other than the cardholder to approve of the transaction can increase security and can help control expenses in some instances.

Embodiments of the invention address these and other problems, individually and collectively.

BRIEF SUMMARY

Embodiments of the invention are directed to methods, server computers, and systems.

Embodiments of the invention permit an approving entity such as an employer to approve or deny transactions conducted by users such as employees, in substantially real time. In embodiments of the invention, a transaction alert request message is sent to a third party such as employer and the employer is allowed to approve or not approve of a transaction being conducted, before or after an issuer approves of the transaction. Embodiments of the invention provide for greater control over the authorization process by an approving entity. Embodiments of the invention also improve the security of the transaction by providing additional authentication data to an issuer.

One embodiment of the invention is directed to a server computer comprising: a processor; and a computer readable medium coupled to the processor, wherein the computer readable medium comprises code executable by the processor for implementing a method comprising: a) receiving an authorization request message, wherein the authorization request message requests authorization to proceed with a transaction conducted between a first party and a second party using a portable device; b) analyzing the authorization request message by a server computer to determine if the portable device is enrolled in a transaction alert program; c) if the portable device is enrolled in the transaction alert program, sending a transaction alert request message to a third party requesting approval to proceed with the transaction; d) receiving a transaction alert response message from the third party; e) sending the authorization request message to an issuer associated with the portable device; f) receiving an authorization response message from the issuer; and g) sending the authorization response message to the second party.

Another embodiment of the invention is directed to a method comprising: a) receiving an authorization request message, wherein the authorization request message requests authorization to proceed with a transaction conducted between a first party and a second party using a portable device; b) analyzing the authorization request message by a server computer to determine if the portable device is enrolled in a transaction alert program; c) if the portable device is enrolled in the transaction alert program, sending a transaction alert request message to a third party requesting approval to proceed with the transaction; d) receiving a transaction alert response message from the third party; d) sending the authorization request message to an issuer associated with the portable device; e) receiving an authorization response message from the issuer; and f) sending the authorization response message to the second party.

Embodiments of the invention are directed to specific combinations of these different aspects, as well as specific embodiments related to those specific aspects.

BRIEF DESCRIPTION OF THE DRAWINGS

FIG. 7 shows an exemplary screenshot that may be viewed by an approving entity.

DETAILED DESCRIPTION

One embodiment of the present invention is directed to a method. In the method, a transaction is conducted between a first party using a portable device and a second party. The portable device may be a payment card such as a credit or debit card. The first party may be a first user and the second party may be a merchant.

At the merchant, the user may take the payment card and may interact with an access device such as a point of sale terminal at the merchant. The point of sale terminal then generates an authorization request message (an authorization request message can refer to a message that requests authorization, typically from an issuer, to proceed with the transaction). The access device then sends the authorization request message to a server computer. The server computer may be present in a payment processing network.

After the server computer receives the authorization request message, it analyzes the authorization request message and determines if the portable device is enrolled in a transaction alert program. If the portable device is enrolled in the transaction alert program, the server computer can initiate sending a transaction alert request message to a third party requesting approval to proceed with the transaction. For example, in one embodiment, the server computer may cause an IPG (Internet Protocol Gateway) to send the transaction alert request message to the third party requesting approval of the transaction. The third party may be, for example, an employer of the first user. The employer may then approve or deny the transaction alert request message and the server computer may then receive a transaction alert response message from the employer. It may be received from the employer via the IPG.

Before or after the third party approves of the transaction, the authorization request message may be forwarded to an issuer associated with the portable device. The issuer may then approve or deny the transaction by approving or denying the authorization request message. The server computer then receives the authorization response message from the issuer, and then sends the authorization response message to the second party (e.g., the merchant).

Exemplary systems and methods are described in further detail below.

I. Exemplary Systems

Figure 1:
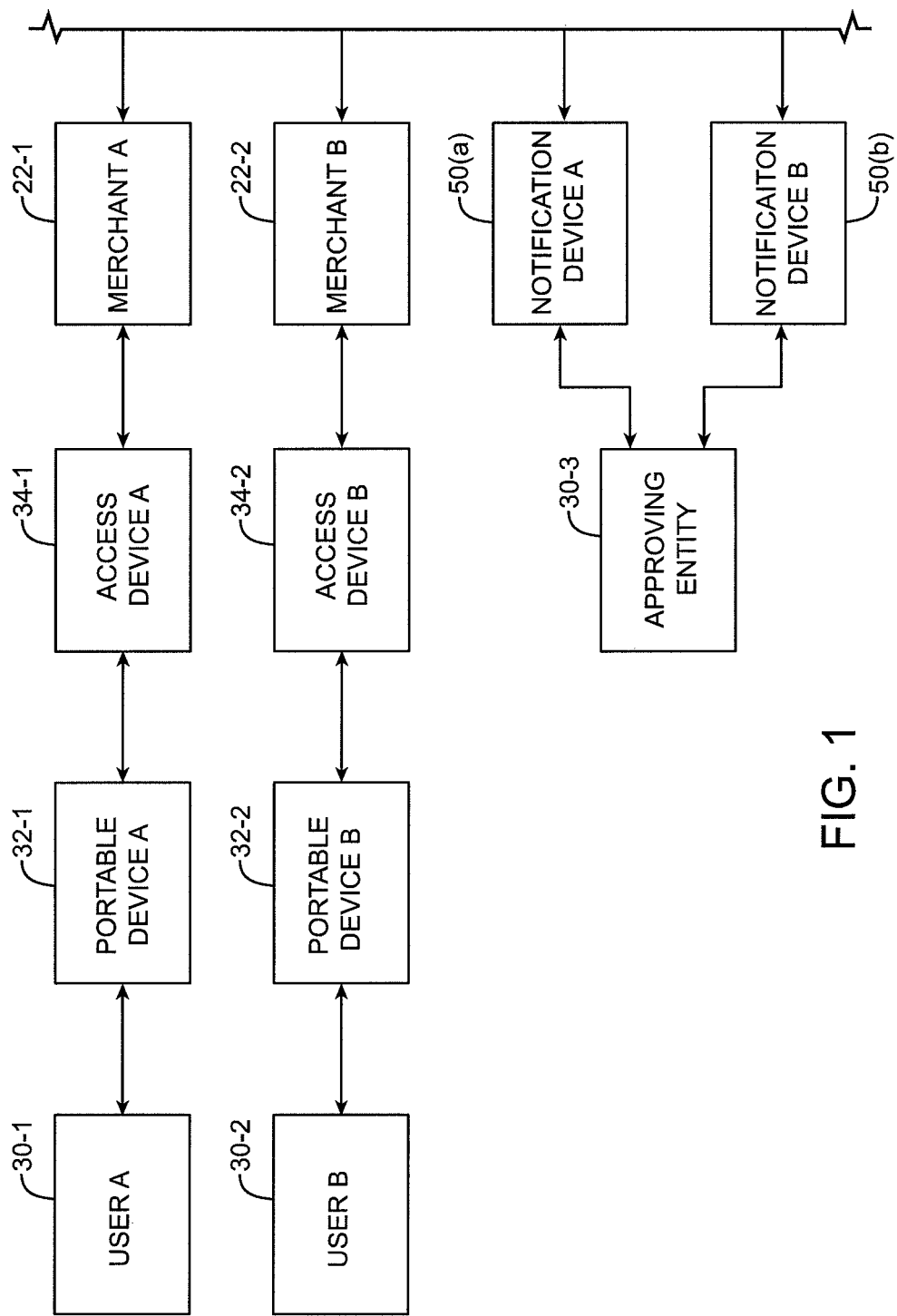
FIG. 1 shows a block diagram of a system that can be used in some embodiments of the invention.
Figure 1:
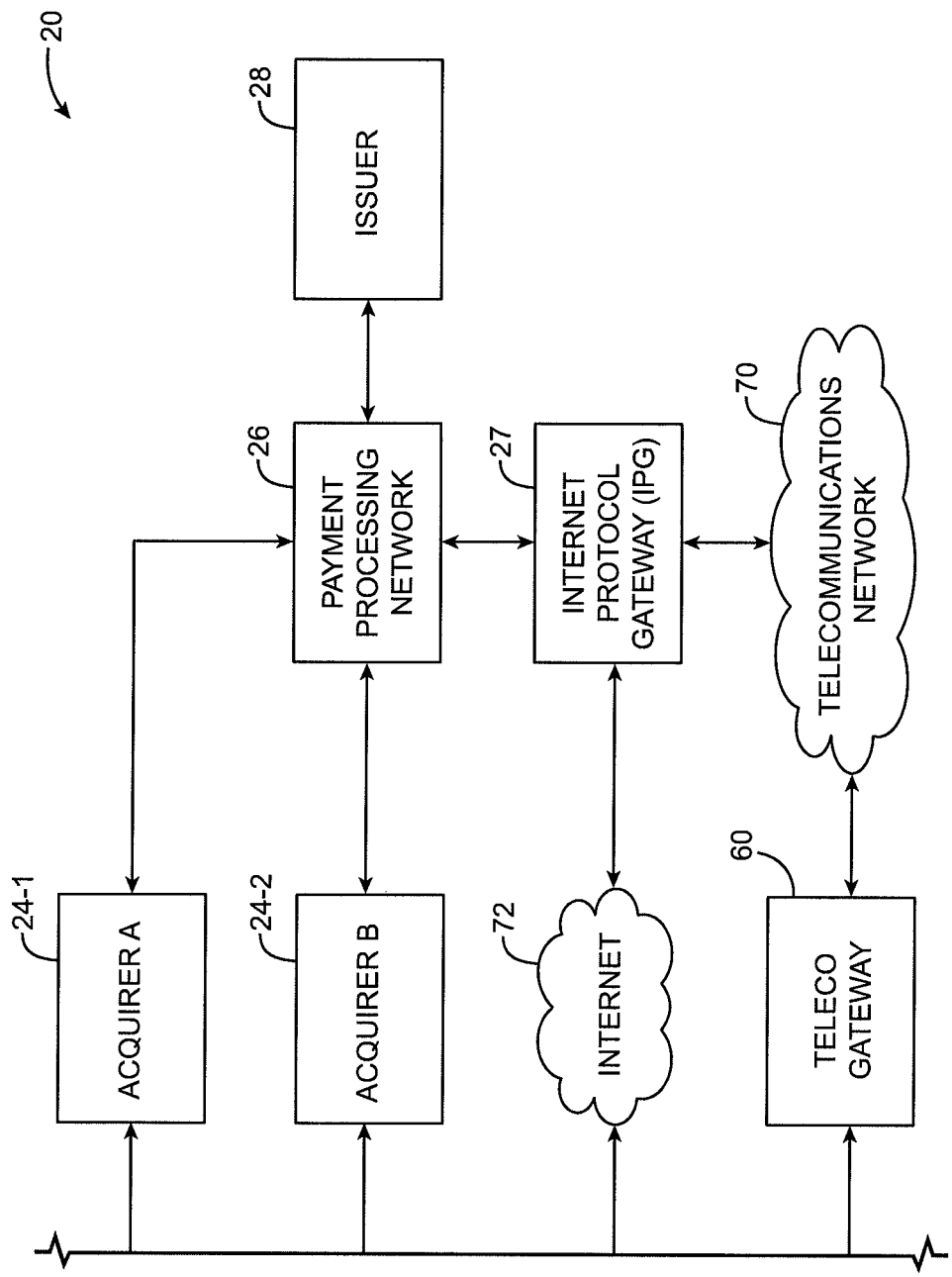

A system according to an embodiment of the invention is shown in FIG. 1. FIG. 1 shows a system 20 that can be used in an embodiment of the invention.

The system 20 may include a plurality of merchants, access devices, portable devices, acquirers, and issuers. For example, the system 20 may include a first merchant 22-1 and a first acquirer 24-1 associated with the first merchant 22-1. The system 20 may also include a second merchant 22-2 and a second acquirer 24-2 associated with the second merchant 22-2. The first and second merchants 22-1, 22-2 may respectively operate first and second access devices 34-1, 34-2. First and second users 30-1, 30-2 may respectively be first and second consumers, and they may purchase goods and services at the first and second merchants 22-1, 22-2.

In a typical payment transaction, the first and second users 30-1, 30-2 may purchase goods or services at the first and second merchants 22-1, 22-2 using their portable devices 32-1, 32-2. The first and second users 30-1, 30-2 may each be an individual, or an organization such as a business that is capable of purchasing goods or services. The acquirers 24-1, 24-2 can communicate with an issuer 28 via a payment processing network 26. The issuer 28 may issue the portable devices 32-1, 32-1 to the first and second users 30-1, 30-2 on behalf of a third party such as an approving entity 30-3.

The approving entity 30-3 may operate one or more notification devices 50(a), 50(b), which may be the same or different, and which may be in operative communication with the payment processing network 26 via the Internet 72 and/or through a telecommunications gateway 60 and an associated telecommunications network 70. In some embodiments, an Internet protocol gateway (IPG) 27 may act as a gateway for providing transaction alert messages from the payment processing network 26 and providing transaction alert response messages to the payment processing network 26. Thus, the IPG 27 can be in operative communication with the payment processing network 26.

The one or more notification devices 50(a), 50(b) may be configured to receive notification data and may include cellular phones, personal digital assistants (PDAs), pagers, computers (personal and laptop), and the like. Although FIG. 1 shows notification devices being used by the approving entity 30-3, it is understood that the users 30-1, 30-2 may also use such notification devices to receive transaction alert messages.

As used herein, an "issuer" is typically a business entity (e.g., a bank) which maintains financial accounts for the consumer and often issues a portable device such as a credit or debit card to the consumer. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Embodiments of the invention encompass such single entity issuer-acquirers.

The portable devices 32-1, 32-2 may be in any suitable form. In some embodiments, the portable devices are portable in nature and may be portable devices. Suitable portable devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable devices include cellular phones, personal digital assistants (PDAs), pagers, payment cards, security cards, access cards, smart media, transponders, and the like. The portable devices can also be debit devices (e.g., a debit card), credit devices (e.g., a credit card), or stored value devices (e.g., a stored value card).

Figure 2:
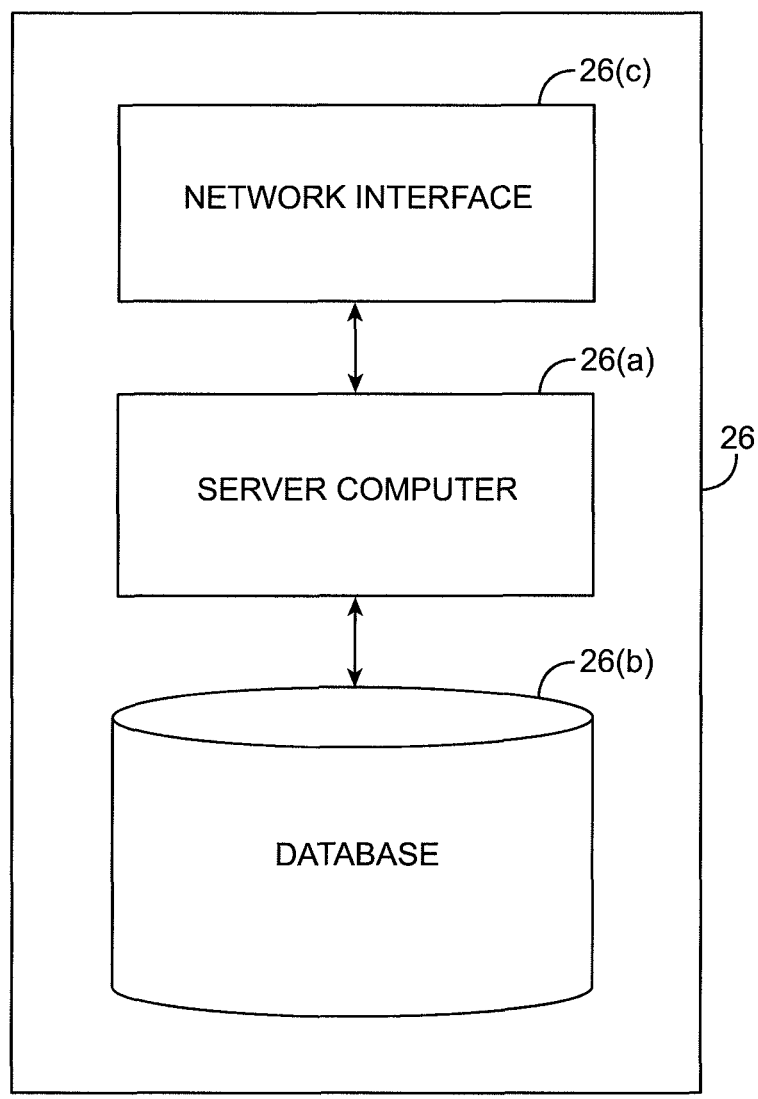
FIG. 2 shows a diagram of a server computer and some components of the server computer according to an embodiment of the invention.

The payment processing network 26 may include data processing subsystems, networks, and operations used to support and deliver authorization services, exception file services, and clearing and settlement services. For example, referring to FIG. 2, the payment processing network 26 may comprise a server computer 26(a), coupled to a network interface 26(c), and a database of information 26(b). An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

As noted above, the payment processing network 26 may include a server computer. As used herein, a "server computer" is typically a powerful computer or cluster of computers. For example, the server computer can be a large mainframe, a minicomputer cluster, or a group of servers functioning as a unit. In one example, the server computer may be a database server coupled to a Web server. The payment processing network 26 may use any suitable wired or wireless network, including the Internet.

The server computer in the payment processing network 26 may comprise a processor; and a computer readable medium coupled to the processor, wherein the computer readable medium comprises code executable by the processor for implementing a method comprising: a) receiving an authorization request message, wherein the authorization request message requests authorization to proceed with a transaction conducted between a first party and a second party using a portable device; b) analyzing the authorization request message by a server computer to determine if the portable device is enrolled in a transaction alert program; c) if the portable device is enrolled in the transaction alert program, sending a transaction alert request message to a third party requesting approval to proceed with the transaction; d) receiving a transaction alert response message from the third party; e) sending the authorization request message to an issuer associated with the portable device; f) receiving an authorization response message from the issuer; and g) sending the authorization response message to the second party.

The merchants 22-1, 22-2 may also have, or may receive communications from, access devices 34-1, 34-2 that can interact with the portable devices 32-1, 32-2. The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If the access devices are point of sale terminals, they may include card readers. The card readers may include any suitable contact or contactless mode of operation. For example, exemplary card readers can include RF (radio frequency) antennas, magnetic stripe readers, etc. to interact with the portable devices.

II. Exemplary Portable Devices, Access Devices, and Computer Apparatuses

Figure 3A:
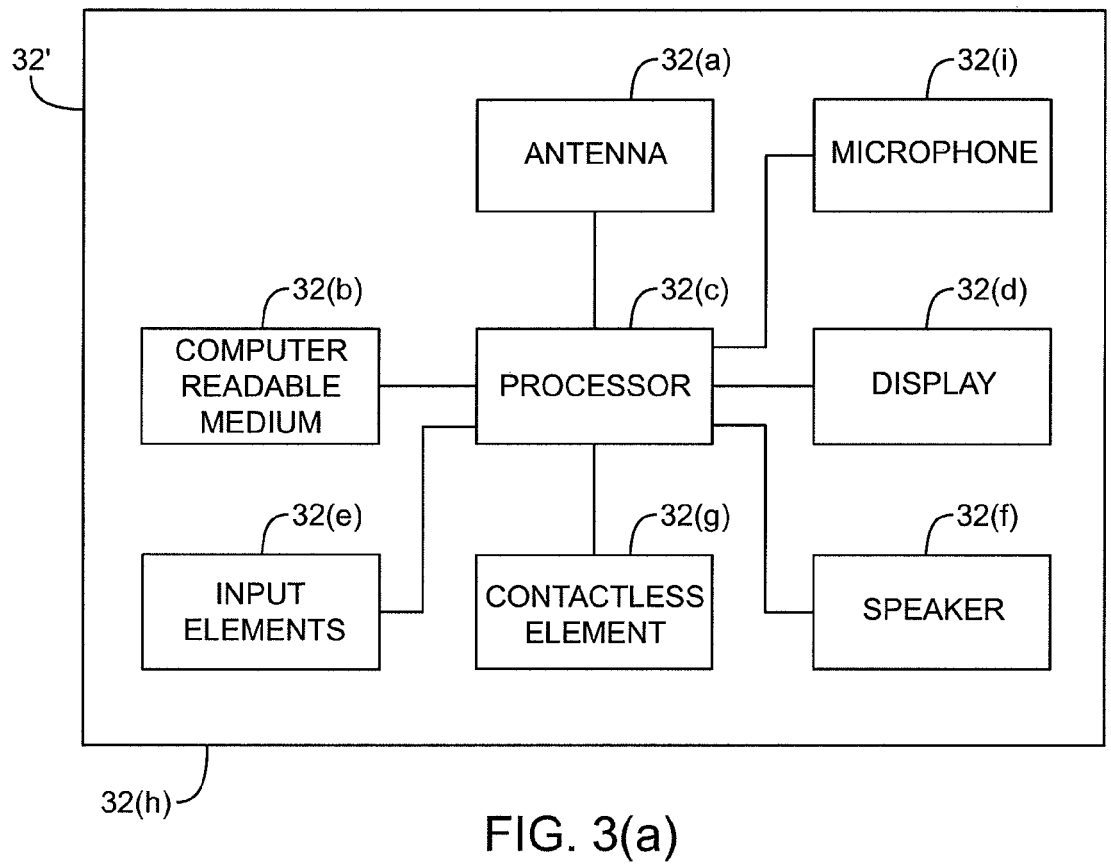
FIG. 3(a) shows a block diagram of a portable device in the form of a phone.
Figure 3B:
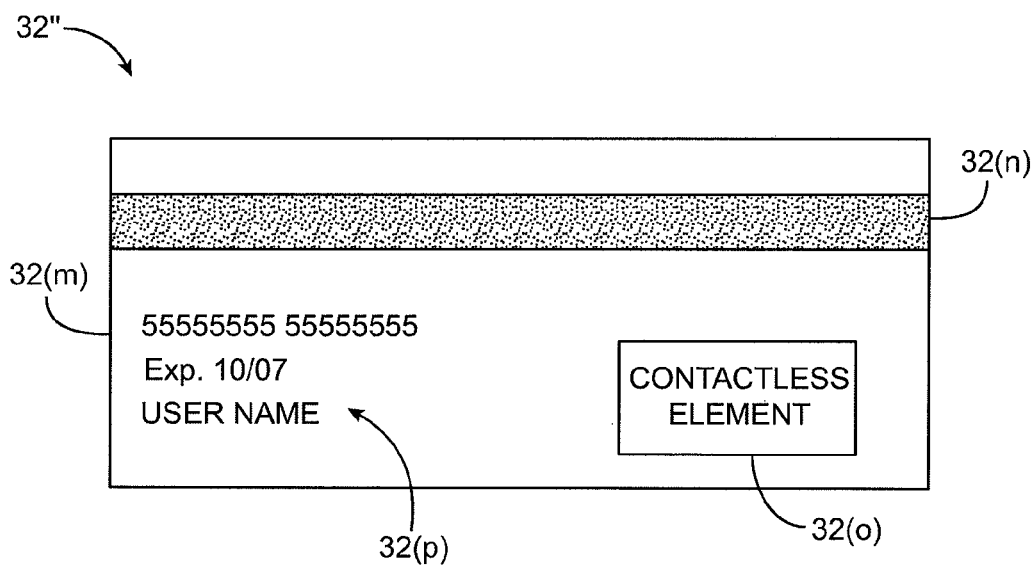
FIG. 3(b) shows an illustration of a payment card.

FIGS. 3(a) and 3(b) show examples of portable devices.

FIG. 3(a) shows a block diagram of a phone 32' that can be used in embodiments of the invention. The phone can be both a notification device that can receive alert messages, as well as a portable device that can be used to make payments. The exemplary wireless phone 32' may comprise a computer readable medium and a body as shown in FIG. 3(a). The computer readable medium 32(b) may be present within the body 32(h), or may be detachable from it. The body 32(h) may be in the form a plastic substrate, housing, or other structure. The computer readable medium 32(b) may be in the form of (or may be included in) a memory that stores data (e.g., issuer account numbers, loyalty provider account numbers, etc.) and may be in any suitable form including a magnetic stripe, a memory chip, etc. The memory preferably stores information such as financial information, transit information (e.g., as in a subway or train pass), access information (e.g., as in access badges), etc. Financial information may include information such as bank account information, loyalty account information (e.g., a loyalty account number), a bank identification number (BIN), credit or debit card number information, account balance information, expiration date, consumer information such as name, date of birth, etc. Any of this information may be transmitted by the phone 32'.

In some embodiments, information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks abide by it. It contains the cardholder's account, encrypted PIN, plus other discretionary data.

The phone 32' may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) phone 32' and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the phone 32' and an interrogation device. Thus, the phone 32' is capable of communicating and transferring data and/or control instructions via both cellular network and near field communications capability.

The phone 32' may also include a processor 32(c) (e.g., a microprocessor) for processing the functions of the phone 32 and a display 32(d) to allow a consumer to see phone numbers and other information and messages. The phone 32' may further include input elements 32(e) to allow a user to input information into the device, a speaker 32(f) to allow the user to hear voice communication, music, etc., and a microphone 32(i) to allow the user to transmit her voice through the phone 32'. The phone 32' may also include an antenna 32(a) for wireless data transfer (e.g., data transmission).

If the portable device is in the form of a debit, credit, or smartcard, the portable device may also optionally have features such as magnetic strips. Such devices can operate in either a contact or contactless mode.

An example of a portable device 32" in the form of a card is shown in FIG. 3(b). FIG. 3(b) shows a plastic substrate 32(m). A contactless element 32(o) for interfacing with an access device 34 may be present on or embedded within the plastic substrate 32(m). Consumer information 32(p) such as an account number, expiration date, and user name may be printed or embossed on the card. Also, a magnetic stripe 32(n) may also be on the plastic substrate 32(m). The portable device 32" may also comprise a microprocessor and/or memory chips with user data stored in them.

As shown in FIG. 3(b), the portable device 32" may include both a magnetic stripe 32(n) and a contactless element 32(o). In other embodiments, both the magnetic stripe 32(n) and the contactless element 32(o) may be in the portable device 32". In other embodiments, either the magnetic stripe 32(n) or the contactless element 32(o) may be present in the portable device 32".

Figure 4:
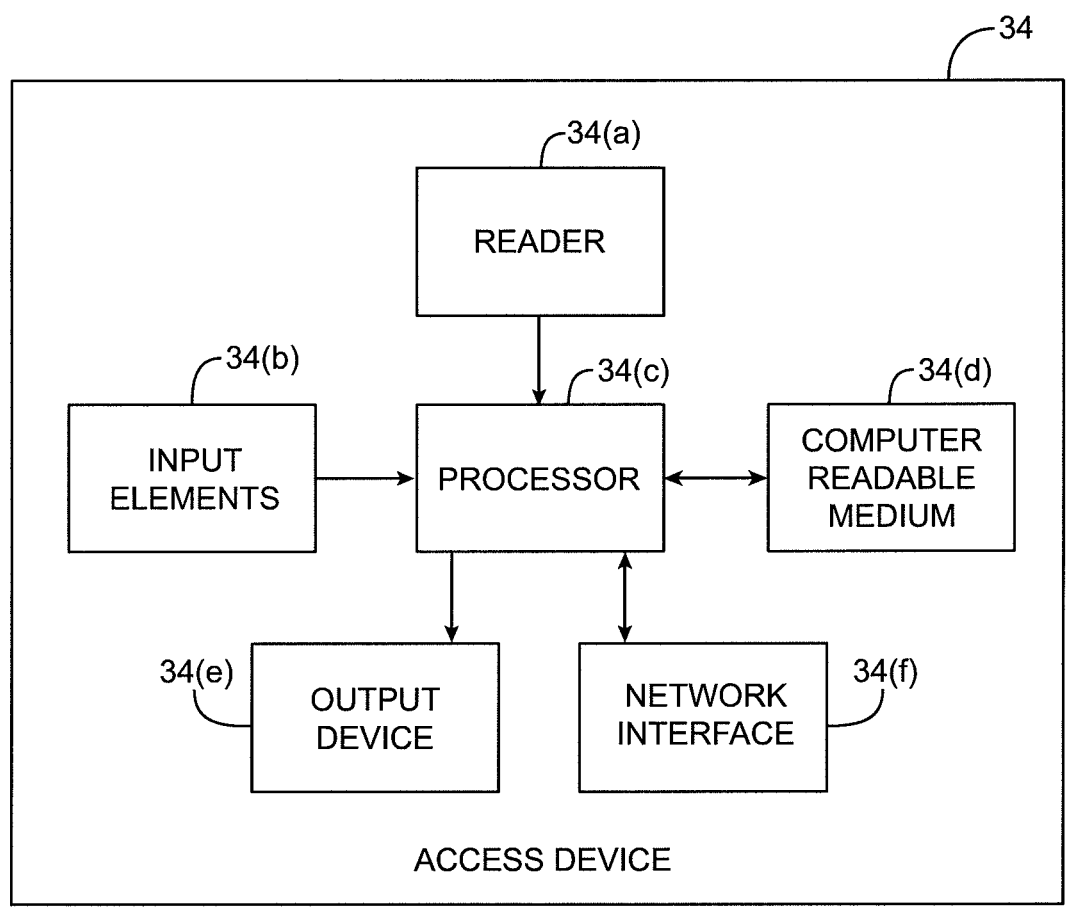
FIG. 4 shows a block diagram of an access device according to an embodiment of the invention.

FIG. 4 shows a block diagram of an access device 34 according to an embodiment of the invention. The access device 34 comprises a processor 34(a)-1 operatively coupled to a computer readable medium 32(a)-2 (e.g., one or more memory chips, etc.), input elements 32(a)-3 such as buttons or the like, a reader 32(a)-4 (e.g., a contactless reader, a magnetic stripe reader, etc.), an output device 32(a)-5 (e.g., a display, a speaker, etc.) and a network interface 32(a)-6. The computer readable medium may have code, executable by a processor, for generating and sending authorization request messages, and also receiving and providing authorization response messages.

Figure 5:
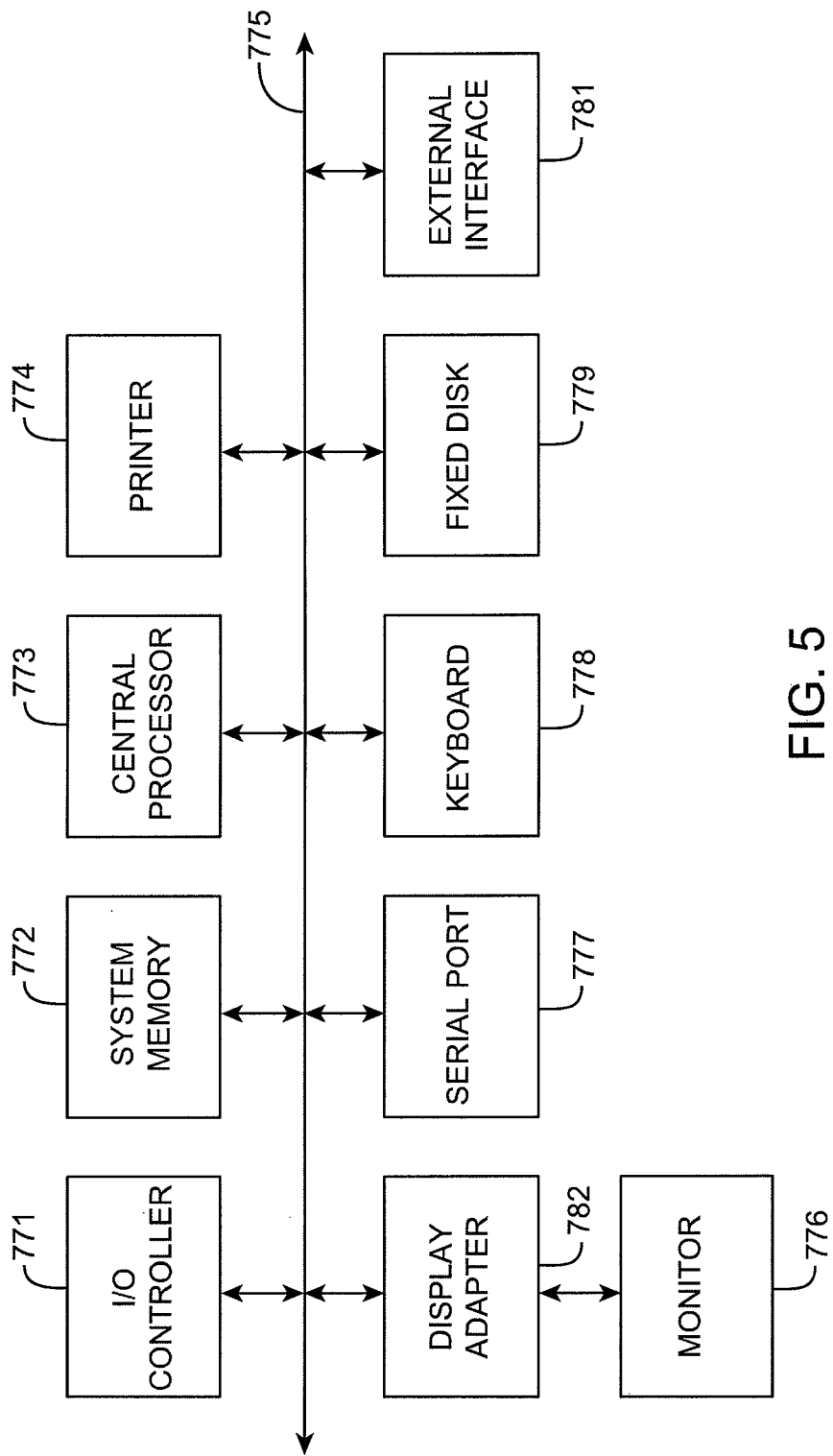
FIG. 5 shows a block diagram of a computer apparatus.

The various participants and elements in FIG. 1 may operate one or more computer apparatuses (e.g., a server computer) to facilitate the functions described herein. Any of the elements in FIG. 1 may use any suitable number of subsystems to facilitate the functions described herein. Examples of such subsystems or components are shown in FIG. 5. The subsystems shown in FIG. 5 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

III. Exemplary Methods

Methods according to embodiments of the invention can be described with respect to FIGS. 1, 2, 6, and 7.

Before transactions are conducted, the various users (30-1, 30-2), portable devices 32-1, 32-2, approving entity 30-3, and notification devices 50(a), 50(b) are enrolled in a transaction alert program. Information regarding these individuals, entities, and devices can be stored in a database 26(b) in the payment processing network 26, and may be entered therein through any suitable process (e.g., through a Web browser). Enrollment information may include, for example, the names, contact information, and notification device identifiers (e.g., phone numbers) of the users 30-1, 30-2, the name of approving entity 30-3, as well as notification device identifiers for the notification devices 50(a), 50(b). Other enrollment information may include the account number that is associated with the portable devices 32-1, 32-2 and the approving entity 30-3. In some embodiments, only one account (and therefore only one account number or account identifier) is associated with both portable devices 32-1, 32-2, and the account is controlled by the approving entity 30-3. For example, the approving entity may be an employer and the portable devices 32-1, 32-2 may be corporate credit or debit cards. All credit or debit cards would be linked to a single account.

As suggested above, the approving entity 30-3 has a relationship with the various users (e.g., user 30-1 and user 30-2) in embodiments of the invention. Examples of approving entities include employers, parents, and administrators, while related users may be employees, children, and associates.

As noted above, one embodiment of the present invention is directed to a method. In the method, a transaction is conducted between a first party and a second party using a portable device such as credit or debit card. The first party may be a first user 30-1 and the second party may be a first merchant 32-1.

In step 202, while the first user 30-1 is at the first merchant 32-1, the first user 30-1 uses a first portable device 32-1 to interact with a first access device 34-1 such as a point of sale terminal.

In step 204, after the interaction, a processor in the first access device 34-1 generates an authorization request message. The authorization request message requests authorization to proceed with the transaction. The authorization request message may include information including at least one of an account number associated with the portable device 32-1, an expiration date associated with the account number, a verification value (e.g., a CVV or card verification value), an access device identifier, a service code, and a transaction amount.

In step 206, a processor in the first access device 34-1 then sends the authorization request message to a server computer 26(a) at the payment processing network 26 via the acquirer 24-1, and it is received by the server computer 26(a) in the payment processing network 26.

In step 208, after the server computer 26(a) receives the authorization request message via a network interface 26(c). A processor in the server computer 26(a) analyzes it and determines if the portable device 32-1 is enrolled in a transaction alert program. A database 26(b) in communication with the server computer 26(b) may contain enrollment information.

In step 210, if the portable device 32-1 is enrolled in the transaction alert program, a processor in the server computer 26(a) initiates the sending of a transaction alert request message to a third party such as the approving entity 30-3 (e.g., an employer) requesting approval to proceed with the transaction. As used herein, "initiating" can include both starting the process of generating a transaction alert request message and also generating the transaction alert message. The step of initiating the sending of the transaction alert message to the approving entity 30-3 by the server computer 26(a) may occur within less than about 10, 5, or 1 minute of the initiation of the transaction by the user 30-1. The transaction may be initiated by the user 30-1 when the portable device 32-1 interacts with the access device 34-1.

The transaction alert request messages may be sent via any suitable communication channel and may be received at any suitable notification device operated by the approving entity 30-3, and they may be in any suitable form (e.g., e-mail, SMS, etc.). For example, in one embodiment, a processor in the server computer 26(a) in the payment processing network 26 may initiate the sending of the transaction alert request message by first contacting the IPG 27. The IPG 27 may then generate and/or send a transaction alert request message to the first notification device 50(a) (e.g., a laptop computer) via the Internet 72. Alternatively or additionally, the IPG 27 may send a transaction alert request message to the second notification device 50(b) (e.g., a mobile phone) via the telecommunications gateway 60 and the telecommunications network 70. The transaction alert message and/or the information needed to send the transaction alert message may be derived at least in part from enrollment information stored in the database 26(b) and also information in the authorization request message that is received by the server computer 26(a).

In step 214, after the approving entity 30-3 receives the transaction alert request message. The approving entity 30-3 may then approve or deny the transaction alert request message using one or more notification devices 50(a), 50(b). In some embodiments, the transaction alert request message may be displayed on one or more of the notification devices 50(a), 50(b), and the graphical user interfaces of the notification devices 50(a), 50(b) may provide a response element (e.g., a selectable button) allowing the approving entity 30-3 to approve or deny the transaction. In this embodiment, the approving entity 30-3 may be someone authorized to act on behalf of the employer (e.g., a manager, an agent of the manager, etc.), and the approving entity 30-3 may actively review the transaction alert request message and may actively respond to it.

An exemplary transaction alert message is shown in FIG. 7. The transaction alert message in FIG. 7 includes a user identifier (e.g., a name, initials, employee number, etc.) 502, a card identifier 506 (an account number or card alias), credit limit or balance after approval 508, a transaction amount 510, and a merchant category indicator 512, or other merchant identifier (e.g., a merchant name).

In addition to these features, various response elements including a transaction approval response element 514 and a contact response element 516 may be included. The transaction approval response element 514 may include "yes" and/or "no" buttons that the approving entity may select from. In other embodiments, if the transaction is to proceed (or not proceed) unless disapproval (or approval) is received from the approving entity 30-3, then only one button may be shown. The contact response element 516 may also include "yes" and/or "no" buttons. Upon the selection of "yes," the employee's phone number, e-mail address, or other contact information may be shown to the approving entity 30-3 so that the approving entity may contact the user 30-1 if the approving entity 30-3 questions the transaction.

In some embodiments, the approving entity 30-3 may comprise or be embodied by a computer apparatus. It may have authorization parameters that are tailored to the needs or desires of the approving entity 30-3. For example, in some embodiments, the computer apparatus at the approving entity 30-3 may contain logic or code which causes a processor in the computer apparatus to automatically approve of transactions less than $50 if the user 30-1 is on a business trip, but to allow for manual approval of any transactions that are valued at more than $50.

Such logic could alternatively or additionally reside at the server computer 26(*a*) in the payment processing network 26. For example, an approving entity 30-3 may specify in the database 26(*b*) that it only wants to receive transaction alert request messages if the value of the transactions exceed a certain predetermined amount. Other constraints (e.g., employee type, transaction location, etc.) can also be used to determine when to send transaction alert request messages and/or when to automatically approve or not approve sent transaction alert request messages.

After the approving entity 30-3 provides a response to the first or second notification device 50(*a*), 50(*b*), the server computer 26(*a*) in the payment processing network 26 may then receive a transaction alert response message from the notification device 50(*a*) or the notification device 50(*b*) operated by the approving entity 30-3 via either the Internet 72 and/or the telecommunications gateway 60.

In step 230, if the transaction is not approved by the approving entity 30-3, a transaction alert response message is sent to the server computer 26(*a*) in the payment processing network 26, and the server computer may then send an authorization response message back to the access device 34-1 indicating that the transaction is denied.

In step 216, if the transaction is approved by the approving entity 30-3, the authorization request message may be forwarded to the issuer 28. A server computer in the payment processing network 26 may modify the authorization request message so that it comprises an indicator. The indicator may indicate whether or not the transaction is approved or not approved by the approving entity 30-3. The indicator may also be useful to the issuer 28 as authentication data, suggesting that the transaction is authentic, because the approving entity has approved of the transaction. The indicator may include any suitable type of data. It may be a binary value, or may in the form of letters, numbers, or combinations thereof.

In step 218, the issuer 28 decides whether or not to approve of the transaction. The issuer 28 may decide to not approve of the transaction if there is insufficient credit or funds in the account associated with the approving entity 30-3. Conversely, the issuer 28 may decide to approve of the transaction if there is sufficient credit or funds in the account associated with the approving entity 30-3.

In step 232, if the issuer 28 denies the transaction, a processor in the server computer at the issuer 28 sends an authorization response message indicating the denial back to the server computer 26(*a*) in the payment processing network 26.

In step 234, the server computer in the payment processing network 26 may then send an authorization response message back to the access device A 34-1 indicating that the transaction is denied.

In step 220, if the issuer 28 approves of the transaction, it sends an authorization response message with the appropriate approval to the server computer in the payment processing network 26.

At this point, optional alert messages (e.g., a second transaction alert message) may be sent by the IPG 27 to the notification devices 50(*a*), 50(*b*) operated by the approving entity 30-3, and/or to notification devices operated by the users (e.g., user 30-1). Such transaction alert messages do not typically contain response elements, but mainly contain information such as the transaction amount, a portable device identifier (a payment card identifier), and a merchant identifier (e.g., the name of the merchant). Like the previously described transaction alert request messages, such transaction alert message may be in the form of e-mails, SMS messages, etc. Also, like the transaction alert request messages, the transaction alert message may be sent within 5, 10, or 15 minutes of the initiation of a transaction.

In step 222, an authorization response message 220 indicating approval of the transaction is then sent to the access device 34-1, via the acquirer 24-1. A processor in the access device 24-1 may then provide an appropriate receipt for the user 30-1.

In step 224, at the end of the day, a clearing and settling process occurs. During the clearing process the acquirer provides the appropriate issuer with information on the sale. No money is exchange during clearing. Clearing involves the exchange of data. The acquirer provides data required to identify an account and provide the dollar amount of the sales. When the issuing bank gets this data, the bank posts the amount of the sale as a draw against the cardholder's available credit and prepares to send payment to the acquirer. The second step is the actual exchange of funds. The issuer sends a record of money that is being transferred from its account to that of the acquirer. From this account, the acquirer pays the merchant. Funds are settled between issuers and acquirers through accounts with large banks that are members of the Federal Reserve System. Payments to merchants are made usually through the Federal Reserve's Automated Clearing House (the "ACH") which is an electronic funds transfer system.

In some embodiments, the above transaction is a first transaction, the authorization request message is a first authorization request message and the authorization response message is a first authorization response message. In some embodiments, the method may further comprise receiving a second authorization request message, where the second authorization request message requests authorization to proceed with a second transaction conducted between a second user 30-2 (a fourth party) and a second merchant 22-2 (e.g., a fifth party) using a second portable device 32-2.

Figure 6:
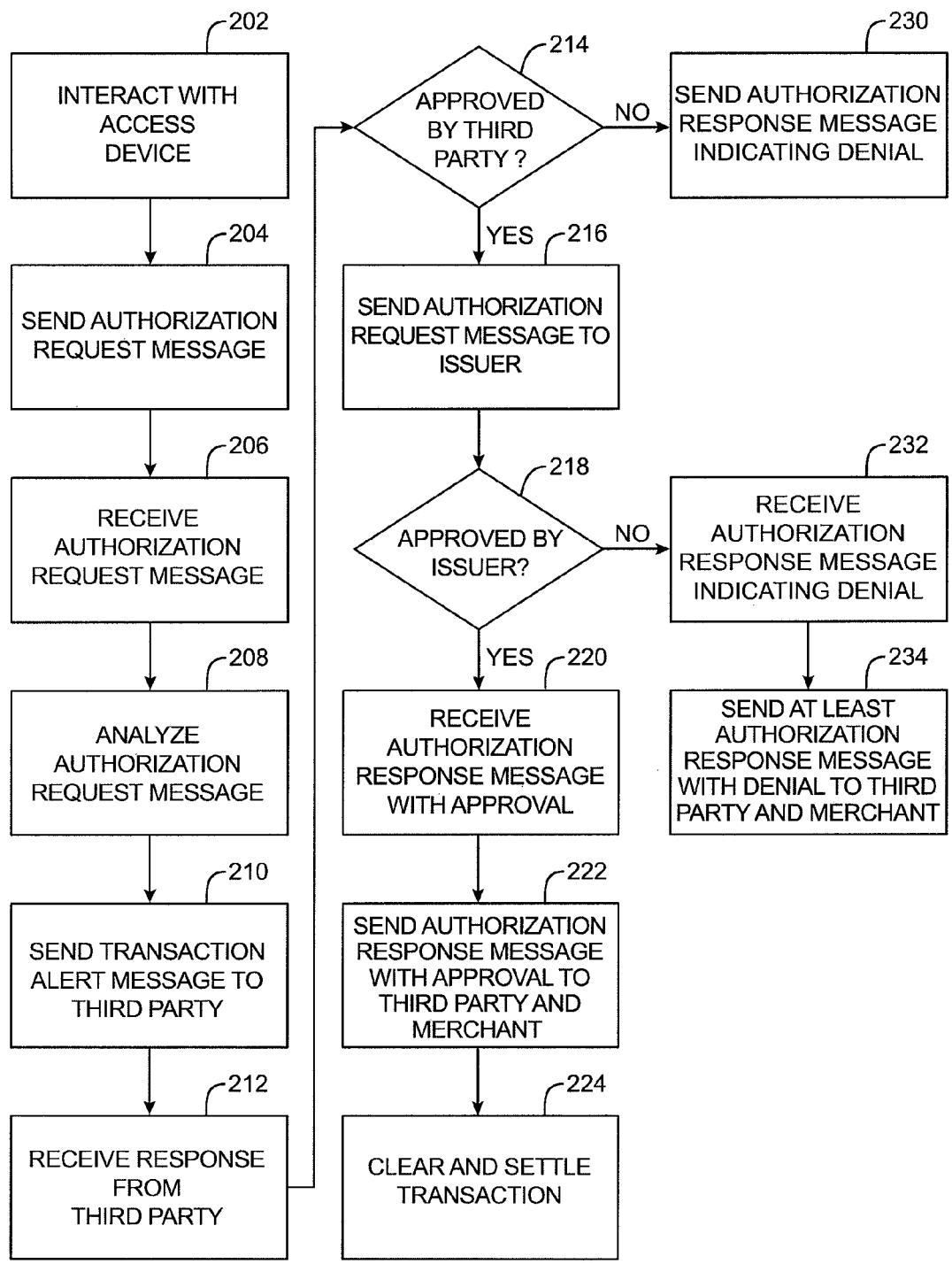
FIG. 6 shows a flowchart illustrating a method according to an embodiment of the invention.

The process flow for the second transaction can be similar to that shown in FIG. 6. For example, the method can include analyzing the second authorization request message by the server computer 26(*a*) to determine if the second portable device 32-2 is enrolled in the transaction alert program. If the second portable device 32-2 is enrolled in the transaction alert program, the server computer 26(*a*) can initiate the sending a second transaction alert request message to the approving entity 30-3 (i.e., a third party) requesting approval to proceed with the second transaction.

In this case, the approval by the approving entity 30-3 may be based on purchases made by both the first user 30-1 and the second user 30-2. For example, the first and second portable devices 32-1, 32-2 may be debit cards associated with a single account managed by the approving entity 30-3. The single account may only have $2000 in it. A first transaction may be conducted by the first user 30-1 for $1500 and it may be approved by approving entity 30-3. Then, a second transaction is conducted by the second user for $400 and may not be approved by the approving entity 30-3, even though it would otherwise be approved by the issuer 28 (because there are sufficient funds in the account). The approving entity 30-3 may not approve of the second transaction, because the approving entity 30-3 may have other employees that are expected to conduct other transactions that have higher priority of the second transaction conducted by second user 30-2.

At a later time, the server computer 26(a) in the payment processing network 26 may receive a second transaction alert response message from the approving entity 30-3 and may send the second authorization request message to the issuer 28, and the server computer 26(a) may receive a second authorization response message from the issuer 28, and may thereafter send the second authorization response message to the merchant 22-2 (i.e., the fifth party). The merchant 22-2 may then provide the authorization response message to the second user 30-2.

In the embodiments described above, the approving entity receives a transaction alert message and indicates his approval or disapproval of the transaction by providing a transaction response message. This is done before an issuer decides on whether or not to approve an authorization request message. In other embodiments, the issuer may approve of the authorization request message first, and may then send an authorization response message back to the payment processing network. Then, the payment processing network may send and the approving entity may receive a transaction alert message which requests authorization to proceed with the transaction. In such embodiments, the authorization response message that is sent by the payment processing network to the merchant's access device could be modified according to whether or not the approving entity approved of the transaction.

Embodiments of the invention have a number of technical advantages. For example, using embodiments of the invention, an approving entity 30-3 may specifically approve of a transaction conducted by someone that it is affiliated with. Further, because the approving entity, has provided specific approval for its transactions, the issuer is provided with additional data indicating that the transaction is in fact authentic.

Embodiments of the invention are not limited to the above-described embodiments. For example, although separate functional blocks are shown for an issuer, payment processing network, and acquirer, some entities perform (e.g., Discover, AMEX, etc.) all of these functions and may be included in embodiments of invention.

Specific details regarding some of the above-described aspects are provided below. The specific details of the specific aspects may be combined in any suitable manner without departing from the spirit and scope of embodiments of the invention.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A server computer comprising:
a processor; and
a computer readable medium coupled to the processor, wherein the computer readable medium comprises code executable by the processor for implementing a method comprising:
a) receiving an authorization request message, wherein the authorization request message requests authorization to proceed with a transaction conducted between a first party and a second party using a portable device;
b) analyzing the authorization request message by the server computer to determine if the portable device is enrolled in a transaction alert program;
c) if the portable device is enrolled in the transaction alert program, initiating the sending of a transaction alert request message to a third party notification device operated by a third party, the transaction alert request message requesting approval to proceed with the transaction;
d) receiving a transaction alert response message from the third party notification device indicating that the third party approves of the transaction;
e) after receiving the transaction alert response message from the third party notification device:
modifying the authorization request message to include an indicator that indicates to an issuer associated with the portable device that the third party approves of the transaction; and
sending the modified authorization request message to the issuer associated with the portable device;
f) receiving an authorization response message from the issuer; and
g) sending the authorization response message to the second party.

2. The server computer of claim 1 wherein the transaction alert message is a first transaction alert message and wherein the method further comprises sending a second transaction alert message to a first party notification device operated by the first party.

3. The server computer of claim 2 wherein the first party is a consumer and the second party is a merchant.

4. The server computer of claim 2 wherein the transaction is a first transaction, the authorization request message is a first authorization request message and the authorization response message is a first authorization response message, and wherein the method further comprises:
- h) receiving a second authorization request message, wherein the second authorization request message requests authorization to proceed with a second transaction conducted between a fourth party and a fifth party using a second portable device;
- i) analyzing the second authorization request message by the server computer to determine if the second portable device is enrolled in the transaction alert program;
- j) if the second portable device is enrolled in the transaction alert program, initiating the sending of a second transaction alert request message to the third party notification device requesting approval to proceed with the second transaction;
- k) receiving a second transaction alert response message from the third party notification device indicating that the third party approves of the second transaction;
- l) after receiving the second transaction alert response message from the third party notification device:
  modifying the second authorization request message to include an indicator that indicates to the issuer that the third party approves of the second transaction; and
  sending the second modified authorization request message to the issuer;
- m) receiving a second authorization response message from the issuer; and
- n) sending the second authorization response message to the second party.

5. The server computer of claim 4 wherein the first party is a first consumer, the second party is a first merchant, the fourth party is a second consumer, the fifth party is a second merchant, and the third party is an employer of the first consumer and the second consumer.

6. The server computer of claim 5 wherein the first and second portable devices are associated with the same account number.

7. The server computer of claim 1 wherein the first party is a consumer and the second party is a merchant.

8. The server computer of claim 1 wherein the portable device is a debit card or a credit card.

9. The server computer of claim 1 wherein the authorization request message comprises a primary account number, an expiration date associated with the portable device, verification value, and a merchant identifier.

10. The server computer of claim 9 wherein the portable device is a debit card.

11. The server computer of claim 1 wherein the indicator is a binary value that indicates to the issuer that the third party has approved of the transaction.

12. The server computer of claim 1 wherein the authorization request message further includes a service code and an access device identifier.

13. The server computer of claim 1 wherein the portable device includes a contactless element, and wherein the contactless element includes a semiconductor chip and a wireless transfer element.

* * * * *